(12) United States Patent
Goettke

(10) Patent No.: US 10,618,069 B2
(45) Date of Patent: Apr. 14, 2020

(54) DISPENSER FOR LIQUID TO PASTY COMPOSITIONS

(71) Applicant: RPC Bramlage GmbH, Lohne (DE)

(72) Inventor: Sabine Goettke, Lohne (DE)

(73) Assignee: RPC Bramlage GmbH, Lohne (DE)

( * ) Notice: Subject to any disclaimer, the term of this patent is extended or adjusted under 35 U.S.C. 154(b) by 0 days.

(21) Appl. No.: 16/318,506

(22) PCT Filed: Jul. 18, 2016

(86) PCT No.: PCT/EP2016/067025
§ 371 (c)(1),
(2) Date: Feb. 26, 2019

(87) PCT Pub. No.: WO2018/014929
PCT Pub. Date: Jan. 25, 2018

(65) Prior Publication Data
US 2019/0255547 A1 Aug. 22, 2019

(51) Int. Cl.
*B05B 11/00* (2006.01)

(52) U.S. Cl.
CPC ...... *B05B 11/00416* (2018.08); *B05B 11/007* (2013.01); *B05B 11/3001* (2013.01);
(Continued)

(58) Field of Classification Search
CPC ............ B05B 11/00416; B05B 11/007; B05B 11/3001; B05B 11/3069; B05B 11/3074; B05B 11/3084
(Continued)

(56) References Cited

U.S. PATENT DOCUMENTS

| 4,458,832 A | 7/1984 | Corsette |
| 4,875,604 A * | 10/1989 | Czech ................. B05B 11/3001 |
| | | 222/257 |

(Continued)

FOREIGN PATENT DOCUMENTS

| DE | 10 2005 049 531 A1 | 10/2006 |
| DE | 10 2008 030 118 A1 | 1/2009 |

(Continued)

OTHER PUBLICATIONS

International Search Report in PCT/EP2016/067025, dated Jul. 5, 2017.

*Primary Examiner* — Patrick M. Buechner
*Assistant Examiner* — Michael J. Melaragno
(74) *Attorney, Agent, or Firm* — Collard & Roe, P.C.

(57) ABSTRACT

A dispenser for liquid to pasty compositions has a pump chamber receiving a pump piston arranged on a pump piston part, a pump chamber with an inlet valve and an outlet valve, a storage space, and a dispenser head, wherein the dispenser head is vertically movable in order to discharge composition in the usual position of the dispenser. A discharge channel is formed in the dispenser head, and the dispenser head has a head cover and the outlet valve has a clamped, flexible annular part. A projecting structure of the head cover directed towards the pump chamber serves to retain the annular part. The dispenser can also have two storage spaces and two pump chambers and two dispenser heads which can be actuated independently of each other in order to discharge the composition.

9 Claims, 7 Drawing Sheets

(52) U.S. Cl.
CPC ...... *B05B 11/3069* (2013.01); *B05B 11/3074* (2013.01); *B05B 11/3084* (2013.01); *B05B 11/3047* (2013.01)

(58) Field of Classification Search
USPC ......................................................... 222/135
See application file for complete search history.

(56) References Cited

U.S. PATENT DOCUMENTS

| | | | | |
|---|---|---|---|---|
| 5,224,627 | A * | 7/1993 | Weag | B05B 11/0054 222/135 |
| 5,351,862 | A * | 10/1994 | Weag | B05B 11/0048 222/145.3 |
| 5,370,318 | A | 12/1994 | Weston | |
| 5,868,287 | A * | 2/1999 | Kurokawa | B05B 11/007 222/380 |
| 6,341,717 | B2 * | 1/2002 | Auer | B05B 11/3029 222/135 |
| 6,371,333 | B2 * | 4/2002 | Lorscheidt | B05B 11/0005 222/321.9 |
| 6,955,278 | B2 * | 10/2005 | Lorscheidt | B05B 11/007 222/320 |
| 6,966,465 | B2 * | 11/2005 | Kang, III | B05B 11/3001 222/321.9 |
| 6,968,981 | B2 * | 11/2005 | Heukamp | B05B 11/007 222/257 |
| 7,028,865 | B2 * | 4/2006 | Heukamp | B05B 11/007 222/207 |
| 7,306,123 | B2 * | 12/2007 | Masuda | B05B 11/0029 222/386 |
| 7,497,354 | B2 * | 3/2009 | Decottignies | B05B 11/3084 222/135 |
| 7,654,418 | B2 * | 2/2010 | Law | B05B 11/3001 222/259 |
| 8,118,195 | B2 * | 2/2012 | Decottignies | B65D 83/0033 222/153.01 |
| 8,225,962 | B2 | 7/2012 | Rossignol | |
| 8,418,887 | B2 * | 4/2013 | Milian | B05B 11/3083 222/137 |
| 8,444,017 | B2 * | 5/2013 | Chiba | B05B 11/3001 222/137 |
| 8,602,265 | B2 * | 12/2013 | Decottignies | B05B 11/007 222/207 |
| 8,608,029 | B2 * | 12/2013 | Lee | A45D 34/00 222/135 |
| 9,101,951 | B2 * | 8/2015 | Goettke | B05B 11/3001 |
| 9,370,790 | B2 * | 6/2016 | Kim | B05B 11/00416 |
| 9,393,582 | B2 * | 7/2016 | Goettke | B05B 11/3001 |
| 9,434,526 | B2 * | 9/2016 | Son | A45D 34/00 |
| 9,555,427 | B2 * | 1/2017 | Alluigi | B05B 11/3011 |
| 10,086,395 | B2 * | 10/2018 | Goettke | B05B 11/3001 |
| 2004/0188464 | A1 * | 9/2004 | Auer | B05B 11/0064 222/135 |
| 2005/0115990 | A1 * | 6/2005 | Kang, III | B05B 11/3001 222/321.9 |
| 2005/0127100 | A1 | 6/2005 | Reggiani | |
| 2005/0189377 | A1 * | 9/2005 | Lanzendorfer | A45D 34/00 222/1 |
| 2006/0255071 | A1 * | 11/2006 | Behar | B05B 11/3015 222/256 |
| 2008/0296319 | A1 * | 12/2008 | Bockmann | B05B 11/3001 222/256 |
| 2010/0044394 | A1 * | 2/2010 | Milian | B05B 11/3083 222/135 |
| 2010/0089945 | A1 * | 4/2010 | Law | B05B 11/3001 222/1 |
| 2010/0200616 | A1 * | 8/2010 | Decottignies | B05B 11/007 222/207 |
| 2011/0068123 | A1 * | 3/2011 | Geiberger | B05B 11/3085 222/135 |
| 2013/0228482 | A1 * | 9/2013 | Son | A45D 34/00 206/219 |
| 2013/0266464 | A1 * | 10/2013 | Presche | B05B 11/007 417/437 |
| 2014/0231463 | A1 * | 8/2014 | Goettke | B05B 11/3001 222/321.7 |
| 2014/0305971 | A1 * | 10/2014 | Goettke | B05B 11/3001 222/380 |
| 2015/0028058 | A1 * | 1/2015 | Kim | A45D 34/00 222/135 |
| 2015/0090739 | A1 * | 4/2015 | Jung | B05B 11/3025 222/205 |
| 2015/0108171 | A1 * | 4/2015 | Kim | B05B 11/3001 222/321.3 |
| 2016/0073762 | A1 * | 3/2016 | Lee | A45D 34/04 222/145.6 |
| 2016/0199863 | A1 * | 7/2016 | Lee | B05B 11/3084 222/135 |
| 2016/0206079 | A1 * | 7/2016 | Lee | B65D 81/325 |
| 2016/0318055 | A1 * | 11/2016 | Scott | B05B 11/3084 |
| 2017/0082475 | A1 * | 3/2017 | Ham | B05B 11/3042 |
| 2017/0136478 | A1 * | 5/2017 | Jung | B05B 11/3069 |

FOREIGN PATENT DOCUMENTS

| | | | |
|---|---|---|---|
| EP | 1 332 798 | 8/2003 | |
| EP | 1 867 397 A1 | 12/2007 | |
| EP | 2407049 A2 | 1/2012 | |
| FR | 2877325 A1 * | 5/2006 | ............ B65D 83/76 |
| KR | 2009-0003240 U | 4/2009 | |
| WO | 2006033524 A1 | 3/2006 | |
| WO | 2007/122087 A1 | 11/2007 | |
| WO | 2014/081136 A1 | 5/2014 | |

* cited by examiner

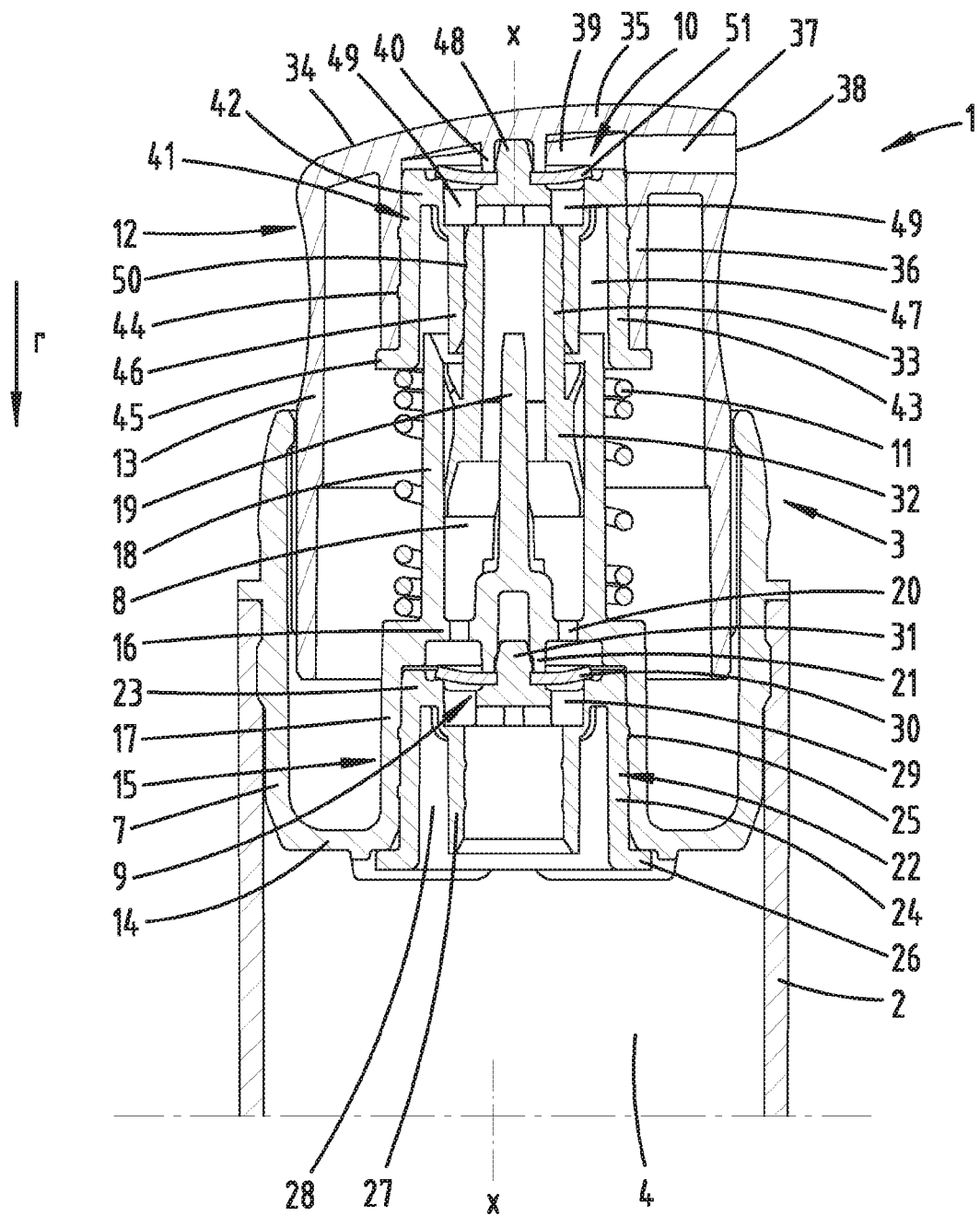

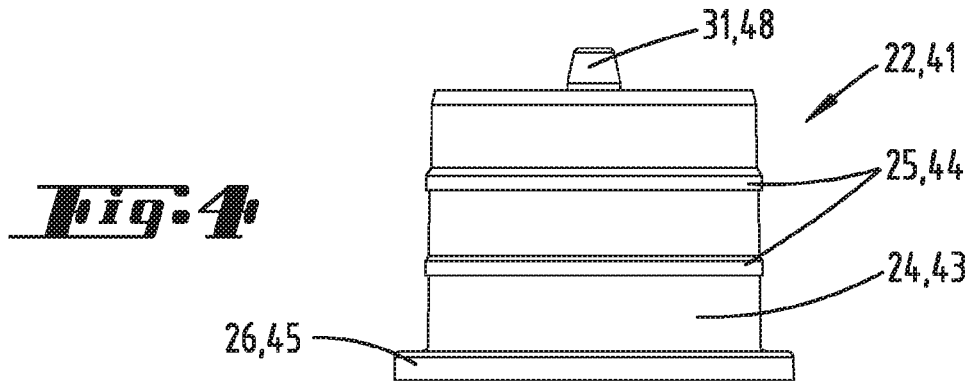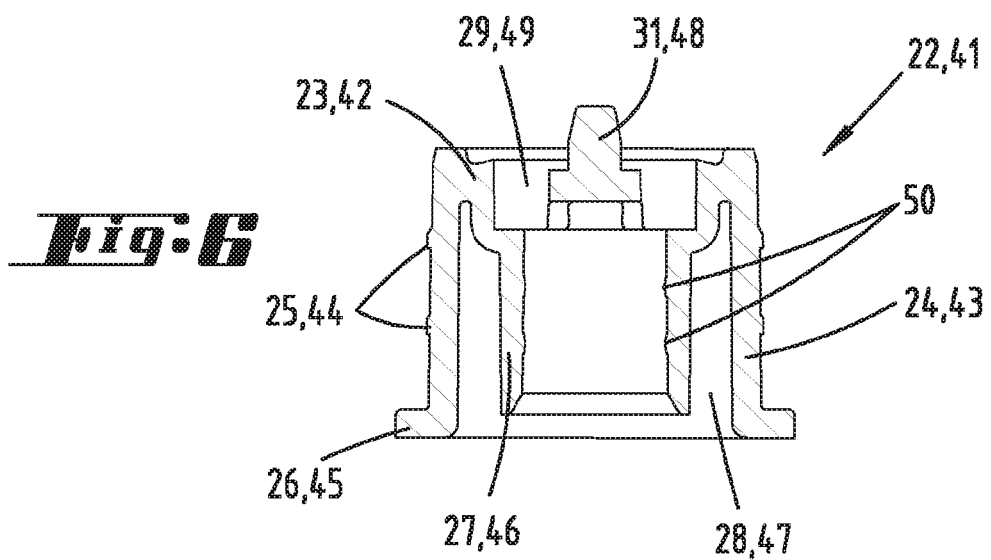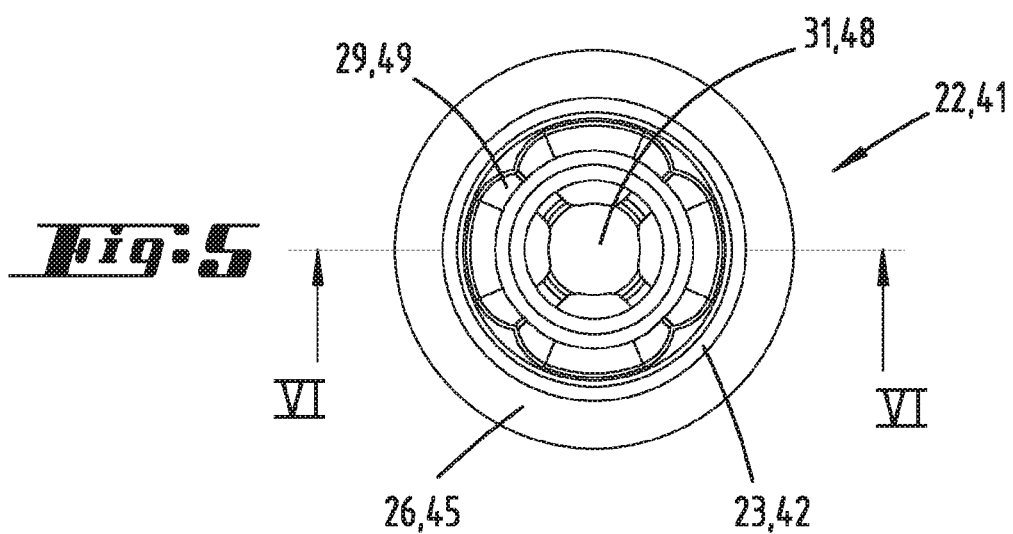

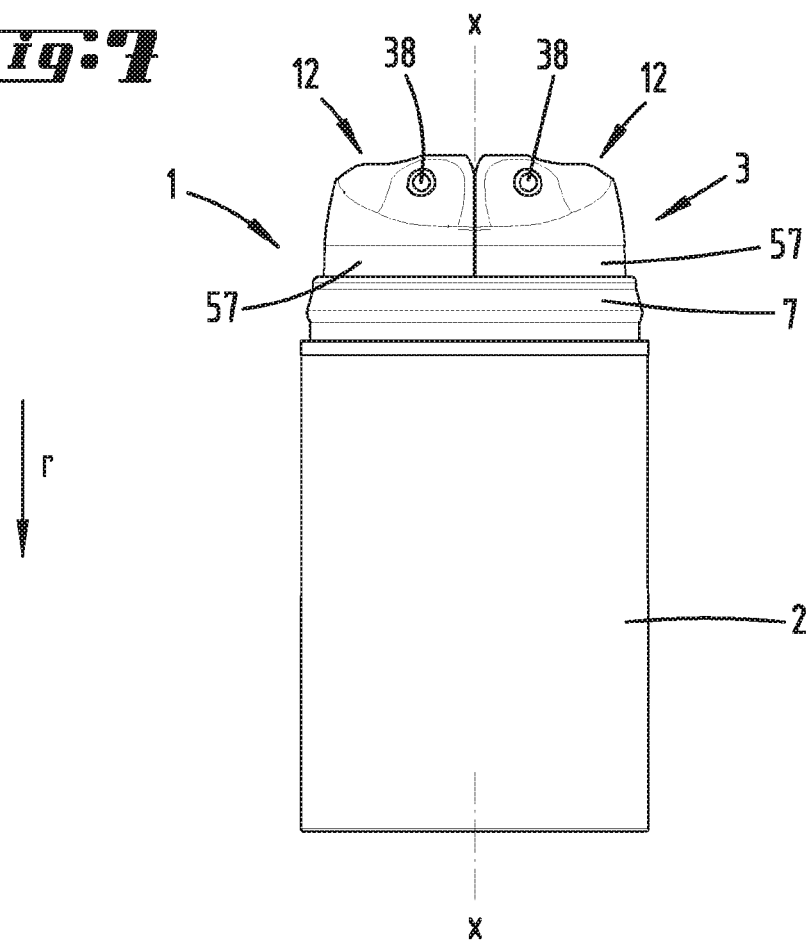
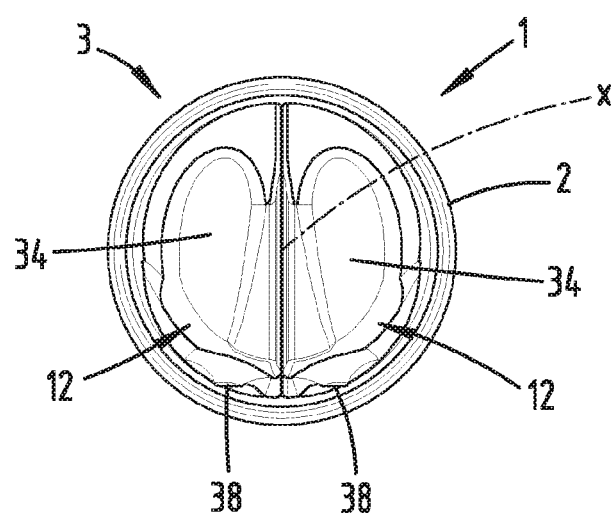

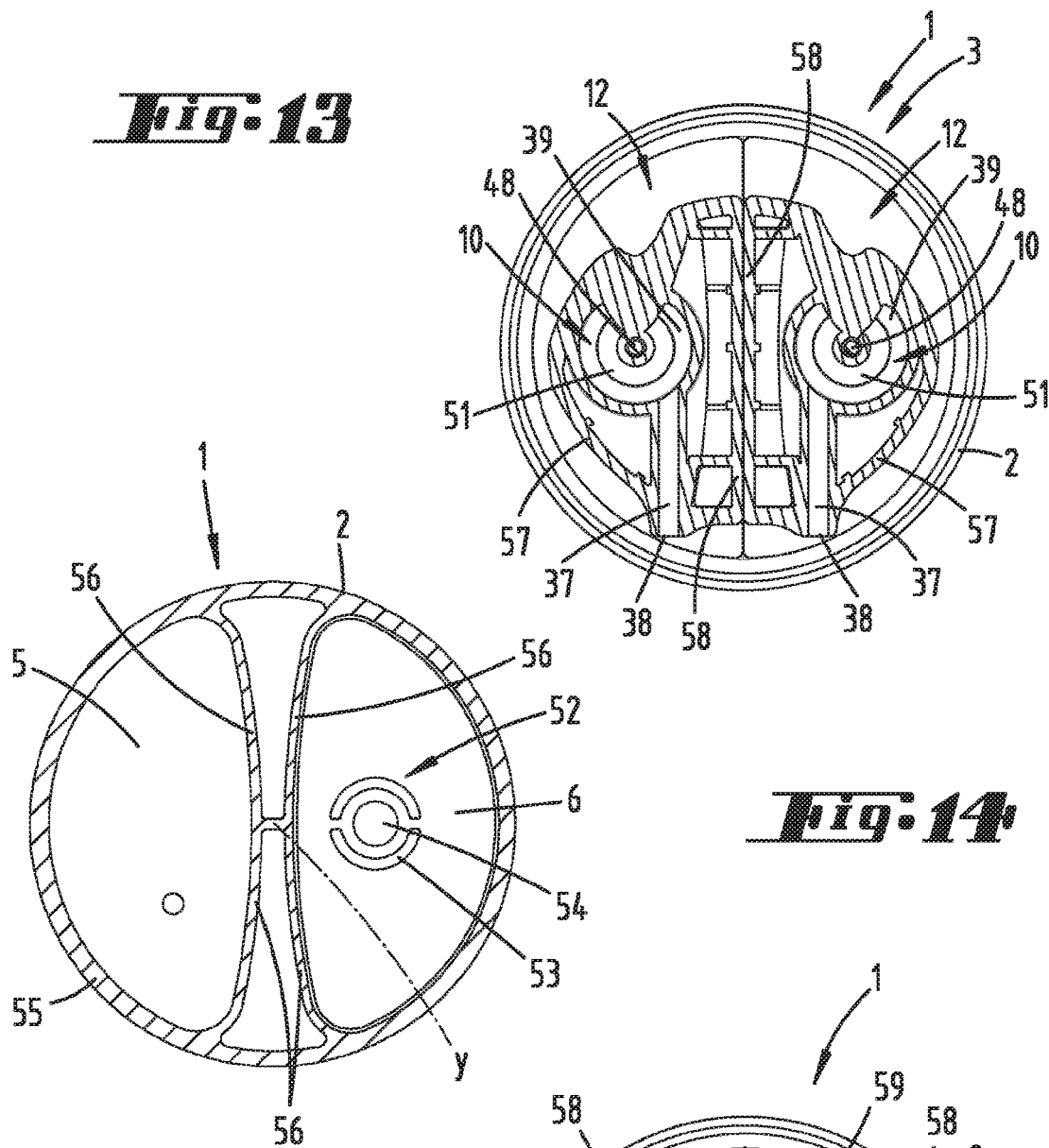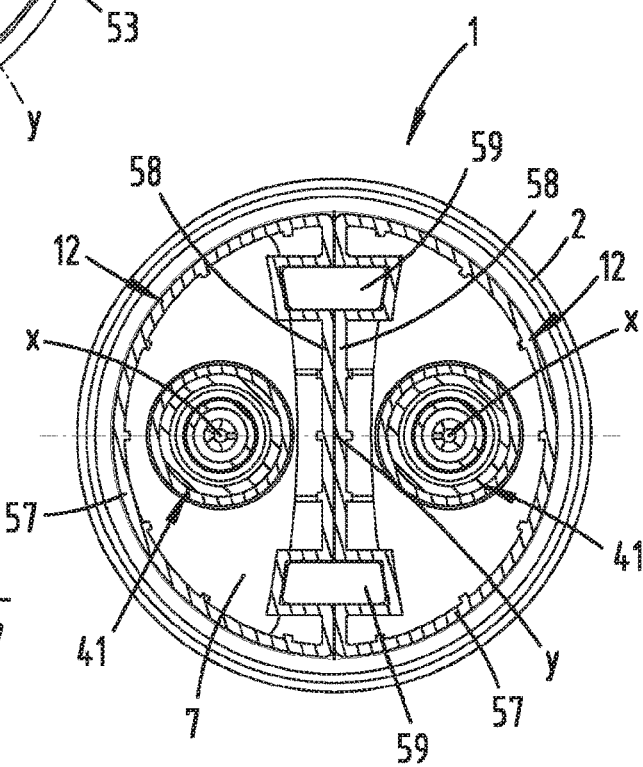

DISPENSER FOR LIQUID TO PASTY COMPOSITIONS

CROSS REFERENCE TO RELATED APPLICATIONS

This application is the National Stage of PCT/EP2016/067025 filed on Jul. 18, 2016, the disclosure of which is incorporated by reference. The international application under PCT article 21(2) was not published in English.

FIELD OF THE ART

The invention relates first to a dispenser for liquid to pasty compositions, having a pump chamber that accommodates a pump piston arranged on a pump piston part, preferably a pump chamber having an inlet valve and an outlet valve, a storage space and a dispenser head, the dispenser head being movable vertically for output of composition with the usual dispenser holder, an output channel being additionally formed in the dispenser head, the dispenser head additionally having a head cover and the outlet valve having a clamped flexible annular part.

STATE OF THE ART

Dispensers of the type in question are known. They are used, for example, for apportioned discharge of cream, also of toothpaste or care cream, or for discharge of lotions, for example, such that a follower piston is preferably provided in a container storing the composition and the composition is discharged in portions by the pump movement of the dispenser head.

Such a dispenser is disclosed in DE 10 2005 049 531 A1, for example.

SUMMARY OF THE INVENTION

With regard to the known state of the art, a technical problem of the invention is seen as how to improve upon a dispenser of the type in question with a simple design that is easy to assemble and in particular is advantageous from the standpoint of manufacturing technology.

One possible solution to the problem according to a first idea of the invention comprises a dispenser, which is aimed at having a shape in the head cover facing the pump chamber serving to secure the annular part.

This provides an approach to securing the annular part that is favorable from the standpoint of a reduced number of components and/or the manufacturing technology. The annular part preferably consists of a thermoplastic elastomer or rubber and is loaded (directly) at the top side by the shape formed on the head cover in the usual type of dispenser holder, in particular for holding the annular part in interaction with another part, for example, a section of the pump piston.

The shape may be and preferably is designed in one piece and made of the same material as the head cover and therefore the dispenser head.

The shape facing the pump chamber is designed to be elevated in the direction of the pump chamber in comparison with a head cover designed otherwise and has a direction of extent across the first extent of the head cover accordingly.

According to another idea of the invention, one solution to the problem with a dispenser can be provided in that a holder part for the outlet valve on the pump chamber side and on the supply room side and the inlet valve has a journal protruding toward the head cover in the installed state, passing through the center of the annular part provided with the outlet valve as well as with the inlet valve, and the two holder parts have an annular space that is open at the bottom in the installed state—starting from a holder part cover holding the journal.

Two holder parts are preferably provided, each shaped to hold and support the annular parts on the valve side. In the usual dispenser position, in which a central axis (optionally the axis of rotation) passing through the dispenser in the longitudinal direction is held at least approximately vertically, the holder parts and/or the journals of the holder parts pointing in the direction of the head cover provide a bottom support of the annular parts. The journals are preferably designed to interact with shapes in the dispenser for acting upon the annular parts at the top, so that the latter are held in their positions. The annular parts protrude freely toward the outside radially like a valve flap in this position of the holder.

In the installed condition, the annular space of each holder part that is open at the bottom of each holder part cover and also has the journal may be used to receive additional dispenser parts, for example. Thus, the holder part associated with the outlet valve may have a pump chamber wall immersed in the annular space following operation of the dispenser. The annular space of the holder part associated with the inlet valve may accommodate the corresponding shape of a follower piston of the container storing the composition.

The arrangement and design of holder parts described above may be used to accommodate the annular part, as is also preferred, in conjunction with the shape in the head cover facing the pump chamber for holding the annular part. The journal of the holder part on the inlet valve side facing the shape can interact with the shape in the head cover as the result of a plug connection between the journal and the shape, for example, but optionally also as a result of a catch connection or an adhesive bond or the like. The journal on the holder part side may be clamped between the shape in the head cover and the holder part cover so that it passes through the annular part in this regard. Such clamping is preferably done toward the inside radially, peripherally to the annular part opening, through which the journal passes. In addition, the annular part extends radially for lobe-type coverage of the outlet openings provided in the inlet valve area.

The annular part of the outlet valve may be directly opposite the head cover on a portion of its top side, in particular with respect to the top side which is not covered by the shape in the head cover. Preferably no other dispenser parts extend between the head cover and the top side of the annular part of the outlet valve—except for the shape which preferably acts centrally on the annular part.

The distance between the head cover facing the annular part and the top side of the annular part of the outlet valve, as seen in the direction of displacement of the dispenser head, may be selected to be smaller than the outside diameter of the annular part. The distance preferably corresponds to less than half the diameter of the annular part down to one-eighth of the annular part outside diameter.

In a preferred embodiment, when the dispenser is operated, the composition that has passed through the outlet valve flows through the space between the annular part on the outlet valve side and the head cover essentially at a right angle to the direction of flow in the pump chamber. This consideration is based in particular on a vertical section through the dispenser when the dispenser is in the usual position, additionally in particular through the pump chamber and the space connected directly to the outlet valve. The direction of flow in the adjacent space need not strictly be at a right angle to the direction of passage of the composition in the pump chamber—when the dispenser is operated. In the sense of the invention, it is also possible to deviate from a right angle in the range of ±15°.

The shape facing the pump chamber for holding the annular part can also be submerged directly in this adjacent space, so that the composition can immediately flow around the shape when the dispenser is operated.

The pump chamber may have an upper cylindrical section that is moved by the dispenser head. It may be delimited by a pump chamber cover, which in turn has flow-through openings to the annular part. The flow-through openings may be arranged along a circular line with respect to an outline of the pump chamber cover, preferably surrounding the journal protruding toward the head cover. The flow-through openings are preferably covered by the annular part to form a seal in the outlet valve closure position.

The outside diameter of the annular part may exceed the inside diameter of the cylindrical section described above. In this way, the outside diameter of the annular part may correspond to 1.1 to 1.5 times the inside diameter of the cylindrical section.

An inner cylindrical section forming the annular space may have locking bulge formations on the inside of both holder parts. These locking bulge formations may serve to lock and secure additional dispenser parts, for example, of a pump piston. The locking bulge formations may be designed like rings or may also be formed by a plurality of protrusions arranged along a circular line, for example.

An outer cylindrical section of both holder parts forming the outside wall of the annular space may have a horizontally protruding peripheral edge on the lower side. Such an edge protruding preferably radially may offer a stop limitation, for example, in the wake of assembly of the dispenser. Such an edge may also offer a supporting surface for additional dispenser parts, for example, a supporting surface for a spring, in particular a compression spring.

In a manner that is particularly advantageous from a technical manufacturing standpoint, the two parts may be designed to be identical in shape. For example, the two holder parts can be manufactured by producing them in the same injection mold by the plastic injection molding method. In addition, there are also direct advantages in assembly because one holder part can be used on both the outlet valve side and the inlet valve side.

In addition, the invention relates to a dispenser for liquid to pasty compositions, having two supply spaces and two pump chambers and two dispenser heads that can be operated independently of one another for discharge of composition, wherein one dispenser head has a dispenser head wall, which forms an outside surface and is guided in coverage and relative to a fixed part of the dispenser and is movable relative thereto.

Such dispensers are also known. Reference is made here to WO 2007/122087 A1, for example.

With regard to the known state of the art, one technical problem with the invention is seen as improving upon a dispenser of the type in question, so that it will be more advantageous in use.

According to a first idea of the invention, one possible approach to solving this problem in the case of dispenser consists of the fact that the dispenser head wall of both dispenser heads is guided and is movable along a portion of its circumference relative to the dispenser head wall of the other dispenser head, and the dispenser head wall has a straight wall section in the area in which it is movable relative to the fixed part of the dispenser in a direction perpendicular to the direction of operation of the dispenser head.

The dispenser heads of the dispenser are operable independently of one another. This offers the advantage that the composition is only dispensed as needed from a pump chamber and/or from a container area of the dispenser storing the composition. Neither the lowering of the dispenser head for discharge of the composition nor the automatic return of the dispenser head back to the starting position, preferably automatically, has any effect on the additional part of the dispenser. The two dispenser heads may also be operated simultaneously, so that the respective compositions can be discharged at the same time through the two dispenser heads. Furthermore, the dispenser heads can also be operated at the same time but over different displacement distances.

Thus, figuratively speaking, this relates to two dispensers, which can be operated independently of one another and are accommodated in the shared housing provided by the fixed part.

With reference to a cross section transversely to the direction of displacement of the dispenser heads through the region of the dispenser heads, each dispenser head has at least one straight wall section, which is preferably designed to face the fixed part, more preferably to face the other dispenser head. Thus, in one possible embodiment, the straight wall sections of the two dispenser heads run in parallel alignment to one another, optionally separated by a wall section of the fixed part.

The straight wall section of a dispenser head may offer twist protection in conjunction with the fixed part. In addition, favorable guidance along the fixed part and/or the wall of the other dispenser head may be achieved in operation of the dispenser head in this way.

A dispenser head may have a discharge opening, out of which the composition is discharged in operation of the dispenser head, with the discharge direction defined as being essentially at a right angle to the direction of operation of the dispenser head in operation of the dispenser head with such a direction with respect to a vertical section through the dispenser in the usual dispenser position. Here again, the definition of a right angle also includes a possible angle deviation of ±15°, for example.

A pump chamber has a central axis running in the direction of operation of the respective dispenser head. In a cross section in which the two central axes of the two pump chambers are the greatest distance apart from one another, the discharge openings projected into this cross section may be arranged on both central axes and offset from one another. The channels in this regard, which run with the channels connected to the space adjacent to the discharge valve, run in the direction of discharge of the composition in a straight line and/or in the same direction in such a cross section.

In addition, there may also be an offset from the straight section of the dispenser head wall.

The discharge openings may thus be a smaller distance apart from one another than the distance between the central axes of the pump chambers. This provides a favorable discharge in particular with simultaneous operation of the two dispenser heads.

The channel connected upstream from the respective discharge opening in the direction of discharge of the composition may be aligned in parallel with respect to the cross section described above, as is also preferable, to the dispenser head wall, which optionally leads to the dispenser heads. Furthermore, the channels may run tangentially into the space adjacent to the discharge valve in the direction of discharge of the composition.

The invention also relates to a dispenser for liquid to pasty compositions, having two storage spaces and two pump chambers and two dispenser heads that can be operated independently of one another for discharge of composition, wherein a follower piston is arranged in each storage space.

To further improve upon a dispenser of the type in question in a manner that will make it more advantageous for use, such a dispenser is provided in which the follower piston has a shape facing the pump chamber for insertion into a connecting opening in the pump chamber on the storage space side, wherein a pump chamber has a central axis running in the direction of operation of the dispenser head and in a cross section, in which the two central axes of the pump chambers are the greatest distance apart from one another, the shapes are designed eccentrically with respect to each follower piston.

According to such a design and a corresponding arrangement of the shape facing the pump chamber in interaction with the connecting opening on the supply space side, a residual amount of composition remaining in the container and/or in the storage space is reduced to a minimum. Due to the eccentric arrangement of the shape on the piston side, on the whole a favorable arrangement of the dispenser parts on the pump chamber side can be achieved.

The eccentric arrangement of the shapes on the piston side is preferably provided in the direction of a dispenser part wall separating the storage chambers.

A follower piston may also have a basic outline with a partially straight edge curve and a partially curved edge. The curved edge may also have a smaller radius of curvature than another edge of the follower piston oriented along a straight line. Thus, a follower piston may be designed in a semicircular shape in a basic outline, which can lead on the whole to a convenient dispenser, which can preferably be gripped with one hand and has an overall cross-sectional area in the shape of a circular disk, in which the straight edges of the follower pistons and/or the less curved edges of the follower pistons point to one another.

The features of the independent claims described above are each important individually as well as in any combination with one another, wherein features of an independent claim can additionally be combined with the features of any other independent claim or with features of a plurality of independent claims, additionally also with just individual features of one or more of the additional independent claims.

With regard to the disclosure content, the ranges, i.e., the value ranges or multiple ranges given above or below also include any values in between, in particular in 1/10 increments of the respective dimension, thus optionally also without any dimensions. For example, the specification 1.1 times to 1.5 times also includes the disclosure of 1.11 to 1.5 times, 1.1 to 1.49 times, 1.11 to 1.49 times, 1.27 to 1.38 times, etc. This disclosure may serve, on the one hand, to restrict such a range limit from the bottom and/or top, but alternatively or additionally, to disclose one or more singular values from a respective given range.

BRIEF DESCRIPTION OF THE DRAWINGS

The invention is explained in greater detail on the basis of the accompanying drawings, although they represent only embodiments. A part that is explained only with reference to one of the embodiments and is not replaced by another part in another embodiment because of the particular feature presented there is thus also described as a part that is at any rate possibly present in this additional embodiment. In the drawings:

FIG. 3 shows the enlargement of the region III in FIG. 2;

FIG. 4 shows a holder part of the dispenser in an individual side view;

FIG. 5 shows the top view hereto;

FIG. 6 shows the section along VI-VI in FIG. 5;

FIG. 7 shows a dispenser in a frontal view in a second embodiment;

FIG. 8 shows the top view hereto;

FIG. 13 shows the section according to line XIII-XIII in FIG. 12;

FIG. 14 shows the section according to line XIV-XIV in FIG. 11;

FIG. 15 shows the section according to line XV-XV in FIG. 12.

DESCRIPTION OF EMBODIMENTS

Figure 1:
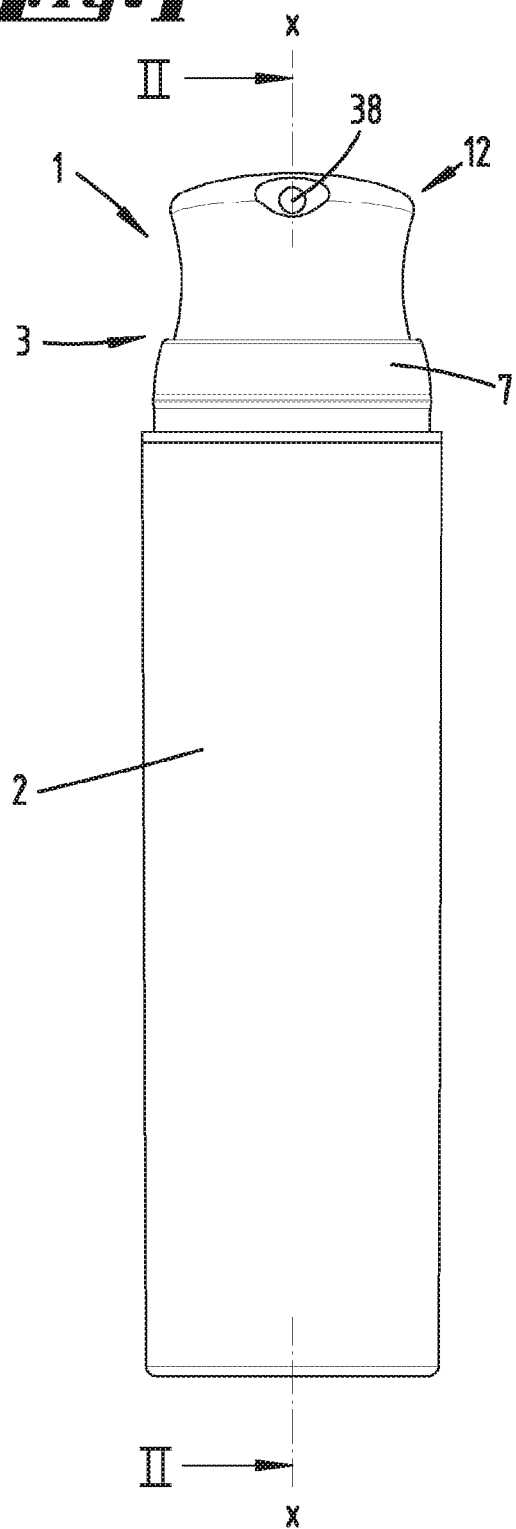
FIG. 1 shows a dispenser in a frontal view, pertaining to a first embodiment.
Figure 2:
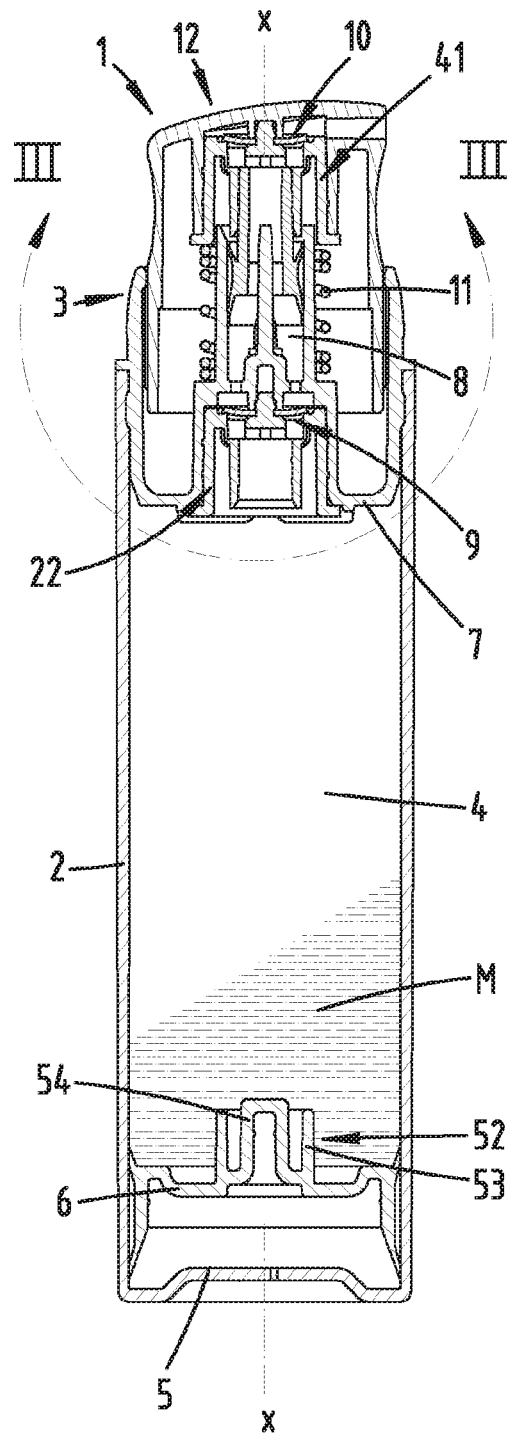
FIG. 2 shows the section along line II-II in FIG. 1.

A first embodiment of a dispenser 1 is illustrated and described, first with respect to FIGS. 1 through 6.

Dispenser 1 is comprised essentially of a hollow cylindrical storage container 2 with a discharge head 3 coupled to it such that said discharge head in the out-of-use position illustrated here may be covered by a cap (not shown).

The molded parts of the dispenser 1 consist primarily of a plastic material such as polyethylene, for example, and are preferably manufactured by the plastic injection molding process. Important exceptions with the embodiments illustrated here at any rate include valves which may be made of a rubbery material which may in fact be a thermoplastic elastomer (and, to this extent, may also be used in the injection molding process) but may preferably also be vulcanized in this embodiment. In addition, a restoring spring 11 which is a metal spring is provided.

The storage container 2 offers a storage space 4 and has a container bottom 5 that is essentially closed (except for a vent hole). The container opening points in the direction of the discharge head 3.

A follower piston 6, by means of which the composition M to be discharged is delivered in the direction of the discharge head 3, is positioned in the storage space 4 and can be moved by the vacuum.

The discharge head 3 is comprised essentially of a pot-shaped lower part 7, which forms a partition with respect to the storage container and/or to the storage space 4, a pump chamber 8 having an inlet valve 9 and an outlet valve 10 and a dispenser head 12 supported on a restoring spring 11.

The lower part 7, the pump chamber 8, the restoring spring 11 and an outside wall 13 of the dispenser head 12 may be arranged on a common axis x in a rotationally symmetrical arrangement, said axis optionally also forming the physical axis of the storage container 2.

The lower part bottom 14 of the lower part 7 has a central pot section 15, which is retracted in the direction of the dispenser head 12 and is preferably concentric with the axis x. The pot cover 16 thereby established at a distance from the plane of extent of the lower part bottom 14 in the axial direction supports the pump chamber wall 18, which runs concentrically with the axis x at the top side, i.e., facing away from the pot wall 17. The pump chamber wall is freely enclosed by the restoring spring 11, which is supported at the base on the pot cover 16.

A mandrel 19 protrudes centrally out of the pot cover 16 along the axis x enclosed by the pump chamber wall 18. This mandrel 19 may have a length along the axis x adapted to the pump chamber wall 18 starting from the pot cover 16.

The average diameter of the mandrel 19 may correspond approximately to one quarter to one-sixth of the inside diameter of the pump chamber 8.

Flow-through openings 20 for the composition M are formed in the pot cover 16 along a circular line radially outside of the root region of the mandrel 19 on the pot cover 16. These flow-through openings 20 extend between the mandrel 19 and the pump chamber wall 18 in a region of the pot cover 16.

At the lower side, i.e., facing away from the mandrel 19, a locking receptacle section 21 directed downward in the direction of the storage space 4 is integrally molded on the pot cover 16. The locking receptacle section protrudes accordingly into the pot opening in the pot section 15.

A lower holding part 22 is secured in the pot section 15. This holding part is preferably designed in the shape of a pot, having a pot cover 23, which is spaced a distance away from the facing lower surface of the pot cover 16 of the lower part 7 in the arrangement position approximately by the axial dimension of the catch receiving section 21.

The circular cylindrical section 24 adjacent to the holding part cover 23 on the lower side may have catch bead formations 25 on the outside of the wall for locking interaction with the pot wall 17.

The cylindrical section 24 develops into a horizontally protruding peripheral edge 26 at the base, i.e., facing away from the holder part cover 23. The peripheral edge is supported on the lower part bottom 14 at the lower side.

In addition, an inner cylindrical section 27, which is preferably in the shape of a ring in the basic outline and forms, together with the outer cylindrical section 24, an annular space 28 that is open at the bottom is also integrally molded on the holder part cover 23.

In the transition region from the inner cylindrical section 27 to the holder part cover 23, flow-through openings 29 are formed along a circular line peripherally with respect to a basic outline of the holder part cover 23. These flow-through openings are covered by a flexible annular part 30, which essentially forms a shape in the outlet valve 9.

The annular part 30 has a journal 31, which is integrally molded on the holder part cover 23 on the top side passing through it centrally, said journal optionally being held with a catch in the locking receptacle section 21 of the lower part 7.

The annular part 30 is clamped between the holder part 22 and the lower part 7. The peripheral region of the annular part 30 on the outside radially may unfold in a flexible manner for opening the valve in the usual way.

A pump piston 32, which is held movably in the axial direction, is arranged in the pump chamber 8 and slides in the usual way with peripheral sealing lips along the inside of the pump chamber wall 18.

The pump piston 32 is provided with a piston neck 33 in the form of a hollow cylinder, extending starting from the pump piston 32 in a direction pointing away from the lower part 7 in the axial direction.

The dispenser head 12 with its outer wall 13 is relatively displaceable in the axial direction with respect to the lower part 7, which is attached to the storage container 2 and is twisted with it, for example.

The dispenser head 12 has an impact surface 34 on the outside of a head cover 35 for operation of the dispenser head on the top side.

A receptacle cylinder 36 with an inside diameter corresponding to the inside diameter of the pot section 15 on the lower part side preferably extends coaxially with the axis x on the inside of the head cover 35. The axial length of the receptacle cylinder 36 may essentially also correspond to that of the pot section 15.

Starting from the receptacle cylinder 36, a discharge channel 37 extends directly from the head cover 35 at the lower side. This discharge channel ends in a discharge opening 38 on the wall side.

The discharge channel 37 opens in a central space 39 facing away from the discharge opening 38.

Protruding from the head cover 35 at the bottom, an essentially annular shape 40 extends into the space 39. It preferably accommodates the axis x centrally.

Another holder part 41 is held with a catch in the receptacle cylinder 36 of the dispenser head 12. This holder part is preferably identical in shape to the lower holder part 22 and therefore has a holder part cover 42, an outer cylindrical section 43, an outer catch formation 44, an edge 45 and an inner cylindrical section 46. The two cylindrical sections 43 and 46 delimit an annular space 47. At the top side of the cover, a journal 48 is also integrally molded on this holder part 41. The flow-through openings 49 passing through the holder part cover 42 surround this journal.

The holder part 41 is held with a catch on the receptacle cylinder 36 by means of the catch formations 44 on the outside of the wall. The edge 45 here is supported on the free peripheral end face of the receptacle cylinder 36 and also offers upper support for the restoring spring 11 in the usual dispenser position.

The piston neck 23 is inserted radially inward into the inner cylindrical section 46 where it cooperates with catch bead formations 50 shaped on the inside of the inner cylindrical section 46. Such inner catch bead formations 50 are also provided with the lower holder part 22.

The journal 48 on the holder part end is inserted into the shape 40 on the head cover end and thereby passes through a flexible annular part 51 essentially forming the outlet valve 10. This annular part 51 is thus held between the holder part 41 and the shape 40. The annular part 51 covers the flow-through openings 49 with its radially overlapping region.

The region of the annular part 51 not covered by the shape 40 of the annular part 51, with its top side sits directly opposite the head cover 35. The space 39 thus extends in this region alone limited at the top side and lower side by the head cover 35 and the annular part 51.

In addition, the top side of the annular part 51 may extend approximately on a plane which intersects or is tangent to the discharge channel 37 in the lower region vertically.

The outside diameter of the annular part 51 may be chosen to be larger than the inside diameter of the inner cylindrical section 46. Thus, the diameter of the annular part 51 may correspond to 1.5 to 2.5 times the inside diameter of the cylindrical section, additionally 2 times the inside diameter of the cylindrical section, for example.

The follower piston 6 arranged in the storage space 4 has a shape 52, preferably central and directed in the direction of the discharge head 3. It is designed on the whole in the shape of a dome, extending accordingly in the direction of travel of the piston beyond a piston bottom into the storage space 4.

The shape 52 may have a cylindrical section 53 with an annular outline on the outside radially and a pot 54 on the inside radially with a pot wall and a pot cover.

The shape 52 is designed and suitable for insertion into a connecting opening on the storage space end, preferably offered by the lower holder part 22. When the follower piston 6 is raised completely, the cylindrical section 53 is inserted into the annular space 28 in this regard, and the pot 54 is inserted into the space of the holder part 22 formed by the inner cylindrical section 27.

In addition, the bottom of the follower piston 6 is additionally preferably adapted to the facing contour of the lower part 7.

The residual amount of composition M is thus reduced to a minimum when the follower piston 6 is completely raised.

The functioning of the dispenser 1 is known to the extent that a proportional amount of pasty composition M is discharged by the pump movement of the dispenser head 12 and the change from vacuum to excess pressure associated therewith.

In particular due to the arrangement of the outlet valve 10 outside of, specifically above the pump chamber 8, a reduction in the diameter of the pump chamber 8 is made possible in the case of a sufficient diameter of the annular part 51 in this regard. A comparatively small proportion of composition M can thus be discharged with a conventional tangible stroke (distance of the dispenser head 12). The central mandrel 19 protruding into the pump chamber 8 contributes additionally to the reduction in the volume of the pump chamber.

Due to pressure acting on the dispenser head 12 and associated with that a downward displacement (fastening opening r) of same, an excess pressure is created in the pump chamber 8, as a result of which the portion stored in this pump chamber 8 can escape through the opened outlet valve 10 and the discharge channel 37. The inlet valve 9 is closed because of the excess pressure.

The composition M, having previously passed through the outlet valve 10, flows through the space 39 between the annular part 51 and the head cover 35 essentially at a right angle to the flow-through direction inside the pump chamber 8. Thus, the discharge channel 37 is additionally oriented essentially at a right angle to the axis x with respect to a vertical section according to FIG. 3.

Figure 9:
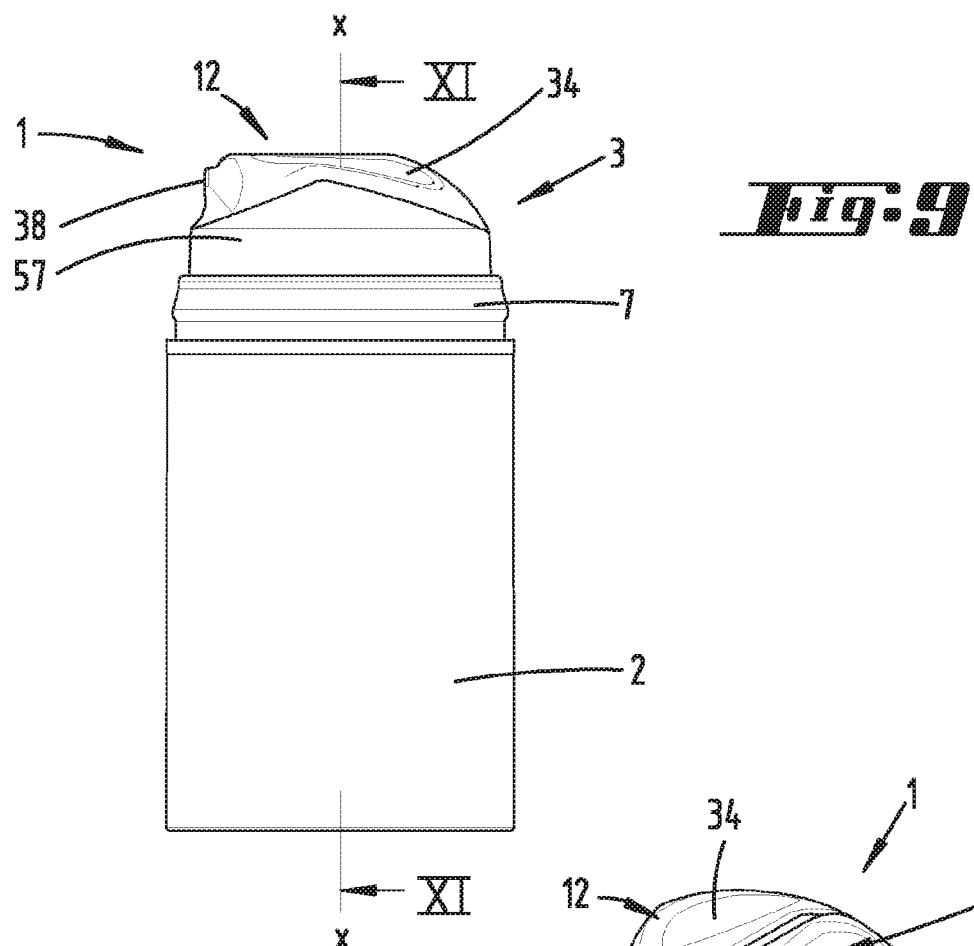
FIG. 9 shows a side view toward the dispenser.
Figure 10:
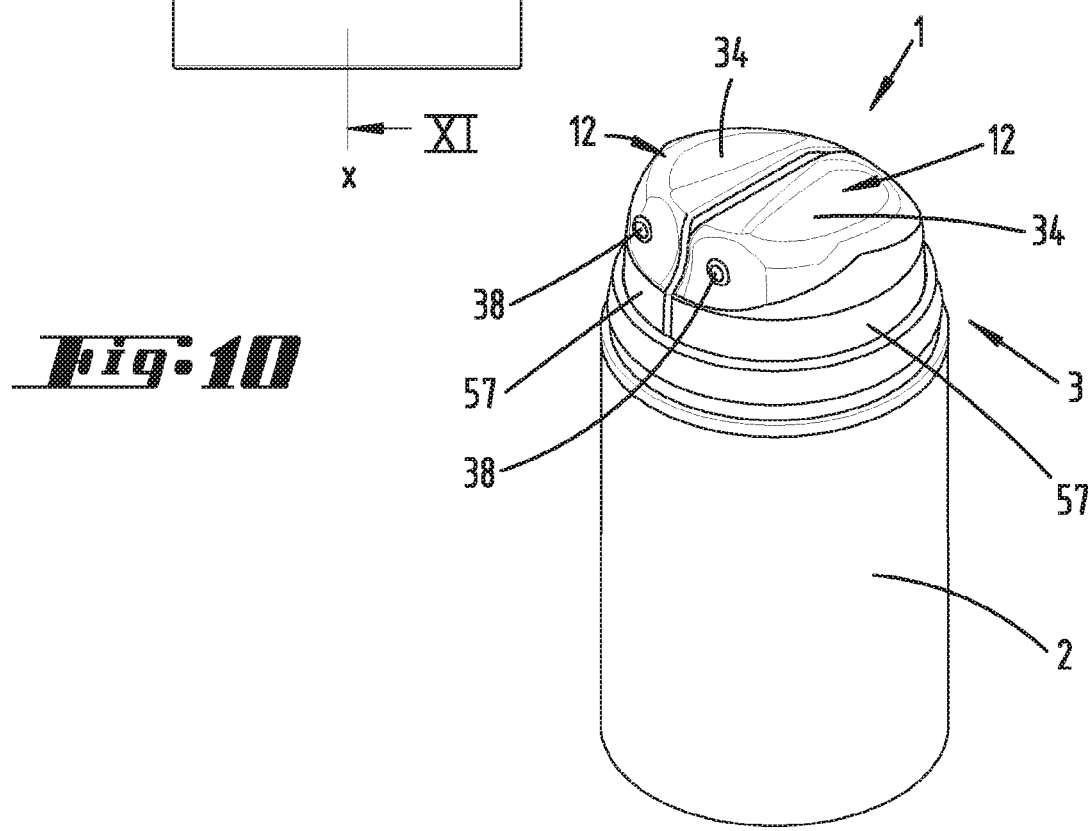
FIG. 10 shows the dispenser in a perspective diagram.
Figure 11:
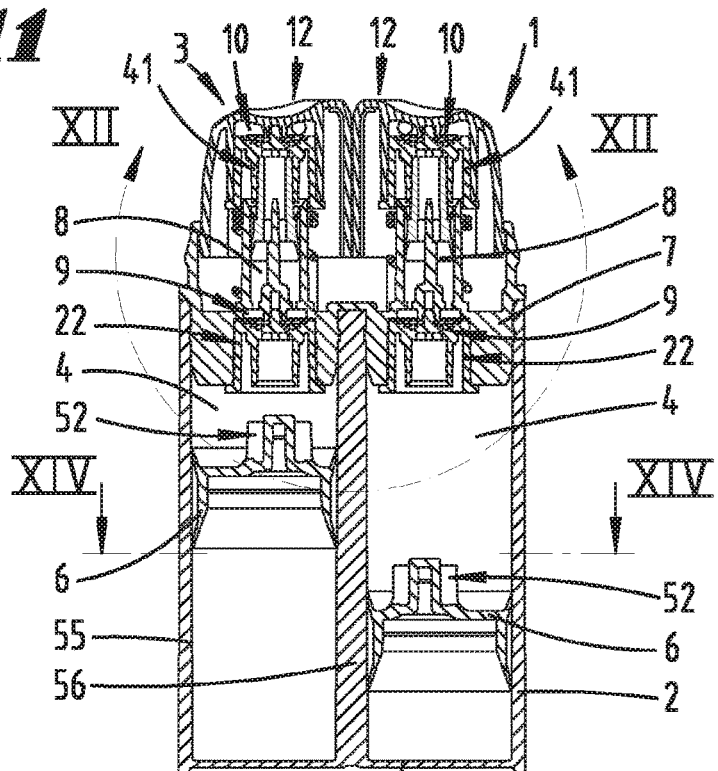
FIG. 11 shows the section according to line XI-XI in FIG. 9.
Figure 12:
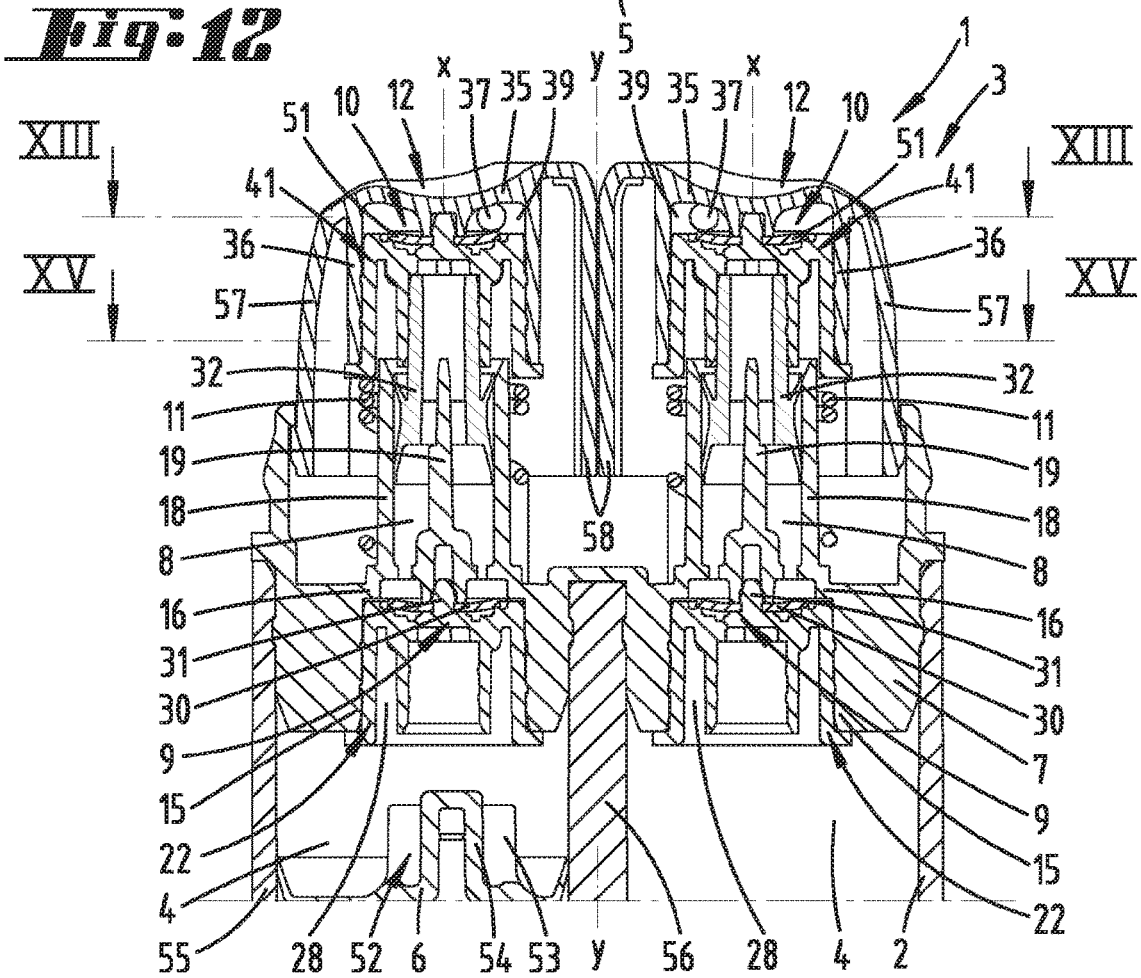
FIG. 12 shows the enlargement of the region XII in FIG. 11.

FIGS. 7 through 15 show a second embodiment of the dispenser 1 which is designed as a double dispenser, having two storage spaces 4, two discharge heads 3 with dispenser heads 12 and two follower pistons 6. The arrangement and design of the equipment of the discharge heads 3 such as the pump chamber 8, pump piston 32, the holder parts 22 and 41 and the design of the inlet and outlet valves 9, 10 correspond to the design described above, so that reference is herewith made to the full content of the disclosure in this regard.

The storage spaces 4 are formed by a shared fixed part 55. It may have a circular outline according to FIG. 14, with two partitions 56 running like a secant on both sides of a dispenser axis y.

The fixed part 55 is connected to a lower part 7 of the discharge head 3. Said lower part 7 preferably bridges the two storage spaces 4 in one piece on the opening end.

The lower part 7 supports the respective pump chamber wall and a central mandrel 19 protruding into the pump chamber wall 18, each associated with a dispenser head 12.

In the area of a respective pot wall 17 on the lower side, the lower holder part 22 is locked with the intermediate connection of the annular part 30 on the inlet valve end.

Each dispenser head 1 has on the lower side a receiving cylinder 36*a* locking hold of the upper holder part 41. Here again, an annular part 51 is held between a holder part 41 and the head cover 35 to form the outlet valve 10.

The dispenser heads 12 can be displaced linearly in the direction of extent of the axis y independently of one another with corresponding entrainment of the respective pump piston 32. It is thus possible for the composition stored in the respective storage space 4 to be discharged by downward displacement and/or actuation of just one dispenser head 12. It is also possible to have simultaneous actuation of the two dispenser heads 12.

The dispenser heads 12 have an essentially semicircular contour with respect to an outline according to FIG. 8, with a dispenser head wall 57 running along a semicircular line and a wall section 58 running at least approximately along a radial line to the dispenser axis y. The wall sections 58 of the two dispenser heads 12 may be in contact with one another and are thus guided in relation to one another and are movable in the axial direction of the dispenser 1.

In addition, there may be a guide of the dispenser heads 12 on the fixed part 55, for example, due to guide blocks 59 traversing the plane of separation between the straight-line wall sections 58, said guide blocks engaging in corresponding indentations in the wall sections 58.

The axes x of each dispenser head 12, along which axes x the parts on the dispenser head end, such as the pump chamber and the holder parts as well as the inlet valves and outlet valves are arranged, lie on a line that may run at a right angle to a plane of separation of the dispenser heads 12 between the straight-line wall sections 58 with respect to a cross section according to FIG. 15. In addition, the dispenser axis y passing through the fixed part 55 centrally also preferably lies on this line connecting the axis x.

The axes x may be situated here at equal distances from the dispenser axis y.

Above the outlet valve 10, in particular above the annular part 51 there is a space 39 which is an approximately annular space on the whole and from which the respective discharge channel 37 branches out tangentially, this annular space being situated between the annular part 51 and the lower side of the head cover 35.

With respect to the cross-sectional diagram in FIG. 13, the result is a preferred parallel orientation of the discharge channels 37 to one another and to the straight-line wall sections 58 of the dispenser heads 12.

In addition, the discharge channels 37 are arranged in such a way that their discharge openings 38 are arranged with an offset in the direction of the straight-line wall sections 58 with respect to the axes x. Accordingly, a clearance between the discharge openings 38, considered transversely to the axes x, is selected to be smaller than the clearance of the axes x relative to one another as seen in the same direction.

The follower piston 6 in each storage space 4 has an outlying contour according to FIG. 14 with a bordering edge oriented partially on a straight line and running in particular along the partition 56 of the fixed part 55 and with a curved bordering edge with a curvature dimension adapted to the inside radius of the fixed part 55.

The shape 52 on the piston end is arranged eccentrically to the piston surface according to the lower holder part 22 arranged on the axis x, in particular in an extension of the axis x on the dispenser head end. The eccentricity here is based on the distance of the axis x from the bordering edges of the follower piston 6 connecting the axes x and intersecting the line running transversely to the axes x, based on a distance of the axis x from the bordering edges. This distance is greater in relation to the outer curved bordering edge than to the inner bordering edge, which is straight and/or less curved. The ratio in this regard may be 2:1 or 1.5:1.

The preceding discussion is used to illustrate the inventions covered on the whole by the present patent application, each independently also improving upon the state of the art at least through the following combinations of features, namely:

A dispenser, which is characterized in that a shape 40 of the head cover 35 facing the pump chamber 8 is used to hold the annular part 51.

A dispenser, which is characterized in that a holder part 22, 41 on the pump chamber end and the storage space end has one journal 31, 48 each for the outlet valve 10 and/or the inlet valve 9 protruding in the installed state toward the head cover 35, passing centrally through an annular part 30, 51 provided on the outlet valve 10 as well as on the inlet valve 9, and the two holder parts 22, 41 have an annular space 28, 47 that is open toward the bottom in the installed state, starting from a holder part cover 23, 42 having journals 31, 48.

A dispenser, which is characterized in that the annular part 51 of the outlet valve 10 is situated directly opposite the head cover 35 on a part of the top side.

A dispenser, which is characterized in that the space 39 between the annular part 51 and the head cover 35 has composition M which had passed through the outlet valve 10 flowing through it essentially at a right angle to the flow-through direction in the pump chamber 8.

A dispenser, which is characterized in that the pump chamber 8 has an upper cylindrical section 43 moved by the dispenser head 12 and limited by a pump chamber cover which has flow-through openings 49 to the annular part 51, and an outside diameter of the annular part 51 exceeds the inside diameter of the cylindrical section 43.

A dispenser, which is characterized in that an inner cylindrical section 27, 46 forming the annular space 28, 47 has catch bead formations 50 on the inside of both holder parts 22, 41.

A dispenser, which is characterized in that an outer cylindrical section 24, 43 forming the outside wall of the annular space 28, 47 has a horizontally protruding peripheral edge 26, 45 on the lower side of both holder parts 22, 41.

A dispenser, which is characterized in that the two holder parts 22, 41 are designed to be identical in shape.

A dispenser, which is characterized in that the dispenser head wall 57 of the two dispenser heads is movable and is guided on a portion of its circumference relative to the dispenser head wall 57 of the other dispenser head 12, and the dispenser head wall 57 has a straight wall section 58 in a direction perpendicular to the direction of actuation of the dispenser head 12 in the area where it is movable relative to the fixed part 55 of the dispenser 1.

A dispenser, which is characterized in that a dispenser head 12 has a dispensing opening 38 out of which the composition M can be dispensed with a dispensing direction essentially at a right angle to the direction of actuation of the dispenser head 12.

A dispenser, which is characterized in that a pump chamber has a central axis x running in the direction of actuation r of the dispenser head 12, and in a cross section in which the two central axes x of the pump chambers 8 are at the greatest distance from one another, the dispensing openings 38 projected into this cross section are arranged with an offset relative to the two central axes x and to one another.

A dispenser, which is characterized in that the offset is in relation to the straight wall section 58 of the dispenser head wall 57.

A dispenser, which is characterized in that two storage spaces 4 and two pump chambers 8 and two dispenser heads 12, which can be actuated independently of one another to dispense the composition M, are provided, such that a follower piston 6, which has a shape 52 facing the pump chamber 8 is arranged in each storage space 4 for insertion into a connecting opening of the pump chamber 8 on the storage space end, wherein a pump chamber 8 has a central axis x running in the direction of actuation r of the dispenser head 12 and in a cross section in which the two central axes x of the pump chambers 8 are at the greatest distance from one another, the shapes 52 are designed to be eccentric with respect to each follower piston 6.

A dispenser, which is characterized in that a follower piston 6 has an outline with a partially straight boundary edge and a partially curved boundary edge.

| List of Reference Numerals | |
|---|---|
| 1 | dispenser |
| 2 | storage container |
| 3 | dispensing head |
| 4 | storage space |
| 5 | container bottom |
| 6 | follower piston |
| 7 | lower part |
| 8 | pump chamber |
| 9 | inlet valve |
| 10 | outlet valve |
| 11 | restoring spring |
| 12 | dispenser head |
| 13 | outside wall |
| 14 | lower part bottom |
| 15 | pot section |
| 16 | pot cover |
| 17 | pot wall |
| 18 | pump chamber wall |
| 19 | mandrel |
| 20 | flow-through opening |
| 21 | locking receptacle section |
| 22 | holder part |
| 23 | holder part cover |
| 24 | cylindrical section |
| 25 | locking formation |
| 26 | edge |
| 27 | cylindrical section |
| 28 | annular space |
| 29 | flow-through opening |
| 30 | annular part |
| 31 | journal |
| 32 | pump piston |
| 33 | piston neck |
| 34 | impact surface |
| 35 | head cover |
| 36 | receptacle cylinder |
| 37 | dispensing channel |
| 38 | dispensing opening |
| 39 | space |
| 40 | shape |
| 41 | holder part |
| 42 | holder part cover |
| 43 | cylindrical section |
| 44 | locking shape |
| 45 | edge |
| 46 | cylindrical section |
| 47 | annular space |
| 48 | journal |
| 49 | flow-through opening |
| 50 | locking bead formation |

-continued

List of Reference Numerals

| | |
|---|---|
| 51 | annular part |
| 52 | shape |
| 53 | cylindrical section |
| 54 | pot |
| 55 | fixed part |
| 56 | partition |
| 57 | dispenser head wall |
| 58 | wall section |
| 59 | guide block |
| r | actuating direction |
| x | axis |
| y | dispenser axis |
| M | composition |

The invention claimed is:

1. A dispenser (1) for liquid to pasty compositions (M), comprising a pump chamber (8), accommodating a pump piston (32) arranged on a pump piston part, said pump chamber (8) having an inlet valve (9) and an outlet valve (10), a storage space (4) and a dispenser head (12), wherein the dispenser head (12) is vertically movable for dispensing the composition (M) in the usual dispenser position, wherein additionally a dispensing channel (37) is formed in the dispenser head (12), wherein additionally the dispenser head (12) has a head cover (35), and the outlet valve (10) has a clamped flexible annular part (51), and further comprising a holder part (41) on an end of the pump chamber for the outlet valve (10) and a holder part (22) on an end of the storage space for the inlet valve (9), wherein each of the holder parts has a journal (31, 48) extending toward the head cover (35) in the installed state, passing centrally through the annular part (51) provided in the outlet valve (10) as well as an annular part (30) provided in the inlet valve (9), and wherein the two holder parts (22, 41) have an annular space (28, 47) that is open toward a bottom in the installed state starting from a holder part cover (23, 42) having the journal (31, 48).

2. The dispenser according to claim 1, wherein the annular part (51) of the outlet valve (10) is directly opposite the head cover (35) for a part of its top side and/or the space (39) between the annular part (51) and the composition (M) which has passed through the outlet valve (10) flows through the head cover essentially at a right angle to a flow-through direction in the pump chamber (8).

3. The dispenser according to claim 1, wherein the pump chamber (8) has an upper cylindrical section (43), which is moved by the dispenser head (12) and is bordered by a pump chamber cover, having flow-through openings (49) to the annular part (51), and wherein an outside diameter of the annular part (51) exceeds an inside diameter of the cylindrical section (43) and/or wherein an inner cylindrical section (27, 46) forming the annular space (28, 47) has locking bead formations (50) on an inside of the two holder parts (22, 41).

4. The dispenser according to claim 1, wherein an outer cylindrical section (24, 43) of the two holder parts (22, 41) forming an outside wall of the annular space (28, 47) has a horizontally protruding peripheral edge (26, 45) on a lower side and/or wherein the two holder parts (22, 41) are designed to be identical in shape.

5. The dispenser according to claim 1, wherein the shape (40) of the head cover (35) facing the pump chamber (8) serves to hold the annular part (51).

6. A dispenser (1) for liquid to pasty compositions (M), comprising two storage spaces (4) and two pump chambers (8) and two dispenser heads (12) that are configured to be operated independently of one another for dispensing the composition (M), wherein each dispenser head (12) has a head cover (35), an outlet valve (10), an inlet valve (9) and a dispenser head wall (57) which forms an outside surface and is guided in correspondence with and relative to a fixed part (55) of the dispenser (1) and is movable relative thereto, wherein the dispenser head wall (57) of one of the two dispenser heads (12) is guided and is movable on a portion of its circumference relative to the dispenser head wall (57) of the other dispenser head (12), and each dispenser head wall (57) has a straight wall section (58) in the area in which it is movable in relation to the fixed part (55) of the dispenser (1), the straight wall section having a cross-section that extends in a direction perpendicular to the direction of operation of the dispenser head (12), and further comprising a holder part (41) on an end of each of the pump chambers for the outlet valve (10) and a holder part (22) on an end of each of the storage spaces for the inlet valve (9), wherein each of the holder parts has a journal (31, 48) extending toward the head cover (35) in the installed state, passing centrally through an annular part (30, 51) provided in the outlet valve (10) as well as in the inlet valve (9), and wherein the two holder parts (22, 41) have an annular space (28, 47) that is open toward a bottom in the installed state starting from a holder part cover (23, 42) having the journal (31, 48).

7. The dispenser according to claim 6, wherein one of the dispenser heads (12) has a dispensing opening (38) configured for dispensing the composition (M) in a dispensing direction essentially at a right angle to the direction of operation of the dispenser head (12) and/or wherein the pump chambers (8) each have a central axis (x) running in a direction of operation (r) of the dispenser heads (12), and wherein in a cross section in which the two central axes (x) of the pump chambers (8) are at the greatest distance from one another, the dispensing openings (38) projected into this cross section are arranged with an offset to both central axes (x) and with an offset from one another and wherein the offset is in relation to the straight wall section (58) of the dispenser head wall (57).

8. A dispenser (1) for liquid to pasty compositions, comprising two storage spaces (4) and two pump chambers (8) and two dispenser heads (12) that can be operated independently of one another for dispensing the composition (M), wherein a follower piston (6) which is arranged in each storage space (4) has a shape (52) facing the pump chamber (8) for insertion into a connecting opening of the pump chamber (8) on the storage space end, wherein a pump chamber (8) has a central axis (x) running in the direction of operation (r) of the dispenser head (12) and the shapes (52) are designed eccentrically with respect to each follower piston (6) in a cross section in which the two central axes (x) of the pump chambers (8) area the greatest distance apart from one another.

9. The dispenser according to claim 8, wherein at least one of the follower pistons (6) has an outline with a bordering edge that is partially straight and partially curved.

* * * * *